United States Patent [19]

Owen et al.

[11] Patent Number: 4,467,283
[45] Date of Patent: Aug. 21, 1984

[54] ELECTRICAL GEOPHYSICAL EXPLORATION SYSTEM WITH ADDRESSABLE CURRENT PROBES

[75] Inventors: Thomas E. Owen, Helotes; Glenn T. Darilek; Wendell R. Peters, both of San Antonio; Edward L. Bryan, Dallas, all of Tex.

[73] Assignee: Geo-Optics, Ltd., Dallas, Tex.

[21] Appl. No.: 304,916

[22] Filed: Sep. 23, 1981

[51] Int. Cl.$^3$ .............................................. G01V 3/02
[52] U.S. Cl. ..................................... 324/363; 324/357
[58] Field of Search .............................. 324/334–336, 324/347, 357, 362, 363, 365, 366, 373, 375, 64; 367/20, 117, 122

[56] References Cited

U.S. PATENT DOCUMENTS

| | | |
|---|---|---|
| 1,841,376 | 1/1932 | Nichols et al. . |
| 2,138,818 | 12/1938 | Jakosky . |
| 2,172,778 | 9/1939 | Taylor, Jr. . |
| 2,207,060 | 7/1940 | Jakosky ............................... 324/363 |
| 2,217,780 | 10/1940 | West et al. ........................... 324/363 |
| 2,231,048 | 2/1941 | Beacham . |
| 2,390,270 | 12/1945 | Piety . |
| 2,531,088 | 11/1950 | Thompson . |
| 2,920,266 | 1/1960 | Owen . |
| 3,065,405 | 11/1962 | Jarrett ................................. 324/373 |
| 3,256,480 | 6/1966 | Runge et al. . |
| 3,262,050 | 7/1966 | Threadgold et al. ............... 324/375 |
| 3,329,929 | 7/1967 | Burnett . |
| 3,344,342 | 9/1967 | Kinghorn . |
| 3,525,037 | 8/1970 | Madden et al. . |
| 3,621,380 | 11/1971 | Barlow, Jr. . |
| 3,659,192 | 4/1972 | Ryss et al. . |
| 3,737,768 | 6/1973 | Lazenby et al. . |
| 3,810,000 | 5/1974 | Aspinall et al. . |
| 3,902,113 | 8/1975 | Bridges et al. ................... 324/366 X |
| 3,975,674 | 8/1976 | McEuen . |
| 3,975,676 | 8/1976 | Bliamptis . |
| 3,984,759 | 10/1976 | St. Amant et al. . |
| 4,041,372 | 8/1977 | Miller et al. . |
| 4,246,538 | 1/1981 | Barker ................................. 324/347 |
| 4,258,323 | 3/1981 | Andrews et al. . |

FOREIGN PATENT DOCUMENTS 1370777  7/1964  France .

OTHER PUBLICATIONS

Subsurface Void Detection Using Surface Resistivity and Borehole Electromagnetic Techniques–Owen et al., Society of Exploration Geophysicists, 50th Annular Meeting of SE$^G$, Houston, TX, Oct. 1981.
Use of an Automatic Earth Resistivity System for Detection of Abandoned Mine Workings–Peter et al., Society of Mining Engineers of AIME (Paper, AIME Meeting, Feb. 22–26 1981).
Modeling Resistivity Anomalies from Localized Voids Under Irregular Terrain–Spiegel et al., Geophysics, vol. 45, No. 7, Jul. 1980.

*Primary Examiner*—Gerard R. Strecker
*Attorney, Agent, or Firm*—Roylance, Abrams, Berdo & Goodman

[57] ABSTRACT

A geophysical exploration system uses a single conductor cable connected to a current source, the cable having a number of earth probes coupled to it at spaced points with addressable switching units. The switching units are activated in sequence so that the probes inject current into the earth. At locations spaced from the probes the resistivity is measured and recorded for each injection. Resistivity measurements are compared with anomaly models to find a match of patterns, indicating the presence, size and location of an anomaly.

4 Claims, 6 Drawing Figures

ELECTRICAL GEOPHYSICAL EXPLORATION SYSTEM WITH ADDRESSABLE CURRENT PROBES

This invention relates to systems for establishing patterns of electrical currents in the earth, measuring the resulting electrical signals and analyzing the measured signals to identify the existence and location of anomalies in the subsurface structure which are of economic interest.

BACKGROUND OF THE INVENTION

The basic principles involved in electrical exploration, and in particular the use of the earth resistivity method, are rather well understood and have been known for many years. Briefly, the fundamental concept can be understood by visualizing a source of voltage or current connected to two electrodes which are connected to the earth at two spaced-apart locations. When energized, current will flow between the electrodes through the earth and that current will follow many paths (theoretically an infinite number). In an idealized situation where the subsurface structure is homogeneous, in the local vicinity of either current electrode the current will establish equipotentials on generally hemispherical concentric surfaces or shells the edges of which will intersect the earth's surface. The magnitudes of the potential measured are functions of the resistivity of the subsurface material and their distances from the source electrode. Thus, measurement of the potentials at the earth's surface permits one to infer data about the earth's substructure materials.

In a real situation, the substructure is not homogeneous throughout any region of significant size. However, it is possible to introduce corrections to account for changes in resistivity which result from strata which cause distortion of the otherwise hemispherical equipotential surfaces or shells. Of more interest, it is possible to identify resistivity anomalies which are very different from the surrounding rock because they consist of concentrations of ores, gas, water or petroleum. Particularly noteworthy is the fact that the resistivity of a petroleum deposit is often different from the surrounding rock. Examples and discussions of prior art techniques and systems can be found in the following documents.

U.S. Pat. No. 1,841,376, Nichols et al
U.S. Pat. No. 2,138,818, Jakosky
U.S. Pat. No. 2,172,778, Taylor, Jr.
U.S. Pat. No. 2,231,048, Beacham
U.S. Pat. No. 2,390,270, Piety
U.S. Pat. No. 2,531,088, Thompson
U.S. Pat. No. 2,920,266, Owen
U.S. Pat. No. 3,256,480, Runge et al
U.S. Pat. No. 3,329,929, Burnett
U.S. Pat. No. 3,344,342, Kinghorn
U.S. Pat. No. 3,525,037, Madden et al
U.S. Pat. No. 3,621,380, Barlow, Jr.
U.S. Pat. No. 3,659,192, Ryss et al
U.S. Pat. No. 3,737,768, Lazenby et al
U.S. Pat. No. 3,810,000, Aspinall et al
U.S. Pat. No. 3,984,759, Gaucher et al
U.S. Pat. No. 3,975,674, McEuen
U.S. Pat. No. 3,975,676, Bliamptis
U.S. Pat. No. 4,041,372, Miller et al
U.S. Pat. No. 4,258,323 Andrews et al
French No. 1,370,777, Fernandez-Bollo Subsurface Void Detection Using Surface Resistivity And Borehole Electromagnetic Techniques-Owen et al, *Society of Exploration Geophysicists,* 50th Annual Meeting of SEG, Houston, Tex., October 1981

Use Of An Automatic Earth Resistivity System For Detection Of Abandoned Mine Workings-Peters et al, *Society of Mining Engineers of AIME* (Paper, AIME meeting, Feb. 22-26, 1981)

Modeling Resistivity Anomalies From Localized Voids Under Irregular Terrain-Spiegel et al, *GEOPHYSICS,* Vol. 45, No. 7, July, 1980

As will be seen, these documents discuss a wide variety of techniques including surface and borehole measurements. They illustrate the many approaches which have been tried and used, and many of them have been successful, especially as an adjunct to other exploration techniques.

For several reasons, however, surface (i.e., not borehole) resistivity exploration has not been as useful as other methods, particularly for petroleum exploration purposes. One reason is that the method is inherently depth-limited, normally being dependent upon the size and electrical contrast of the target deposit.

Another reason relates simply to the practical problems of handling the equipment in the field. As will be seen from the above references, one must handle long and relatively cumbersome electrical cables which interconnect the current injecting electrodes and the current source, and one must also provide measuring equipment. Furthermore, this equipment must be, in part, highly mobile to make the measurements, and the probes and cables must be frequently relocated to execute the survey. Because the equipment of the prior art is difficult to handle, much time has been required to make measurements, causing the procedure to be expensive.

Perhaps the most significant factor, however, is the lack of sufficient accuracy. Partly because the equipment is hard to handle, only relatively few measurements are normally made which means that insufficient data is gathered to permit accurate prediction of anomaly locations or characteristics. And finally, the amount of data processing required to analyze the data from even a few detector/emitter combinations is very laborious and time consuming.

BRIEF DESCRIPTION OF THE INVENTION

An object of the present invention is to provide an earth resistivity measurement and analysis system which is capable of making and recording a large number of measurements and analyzing the results of those measurements to locate and identify subsurface anomalies.

A further object is to provide apparatus for making resistivity measurements which is quicker and easier to handle and use than that of the prior art and which therefore permits a much larger number of measurements at different locations, providing an increased amount of data on a given region.

A still further object is to provide a system with which redundant measurements can be made to provide a large amount of data on a large number of subsurface locations to indicate differences which represent resistivity contrasts.

Another object is to provide such a system in which numerical models of predicted resistivity patterns are constructed and compared with resistivity measurements to arrive at a pattern representing the region being examined.

Briefly described, the invention includes a resistivity exploration system comprising a source of electric current, a single conductor cable connected to the output of said current source, said cable having a plurality of longitudinally spaced connection points, a plurality of probe means for coupling current into the earth, a plurality of addressable switching units, each of said switching units being connected between one of said connection points along said cable and one of said probe means, each of said switching units being responsive to a unique address signal to temporarily electrically interconnect its associated connection point and probe, means coupled to said cable for providing a series of address signals on said single conductor to sequentially activate said switching units whereby current from said source is connected individually through said switching units to said probes in a predetermined sequence, and means for measuring earth potential at locations spaced from said probes.

In order that the manner in which the foregoing and other objects are attained in accordance with the invention can be understood in detail, particularly advantageous embodiments thereof will be described with reference to the accompanying drawings, which form a part of this specification and wherein.

Figure 1:
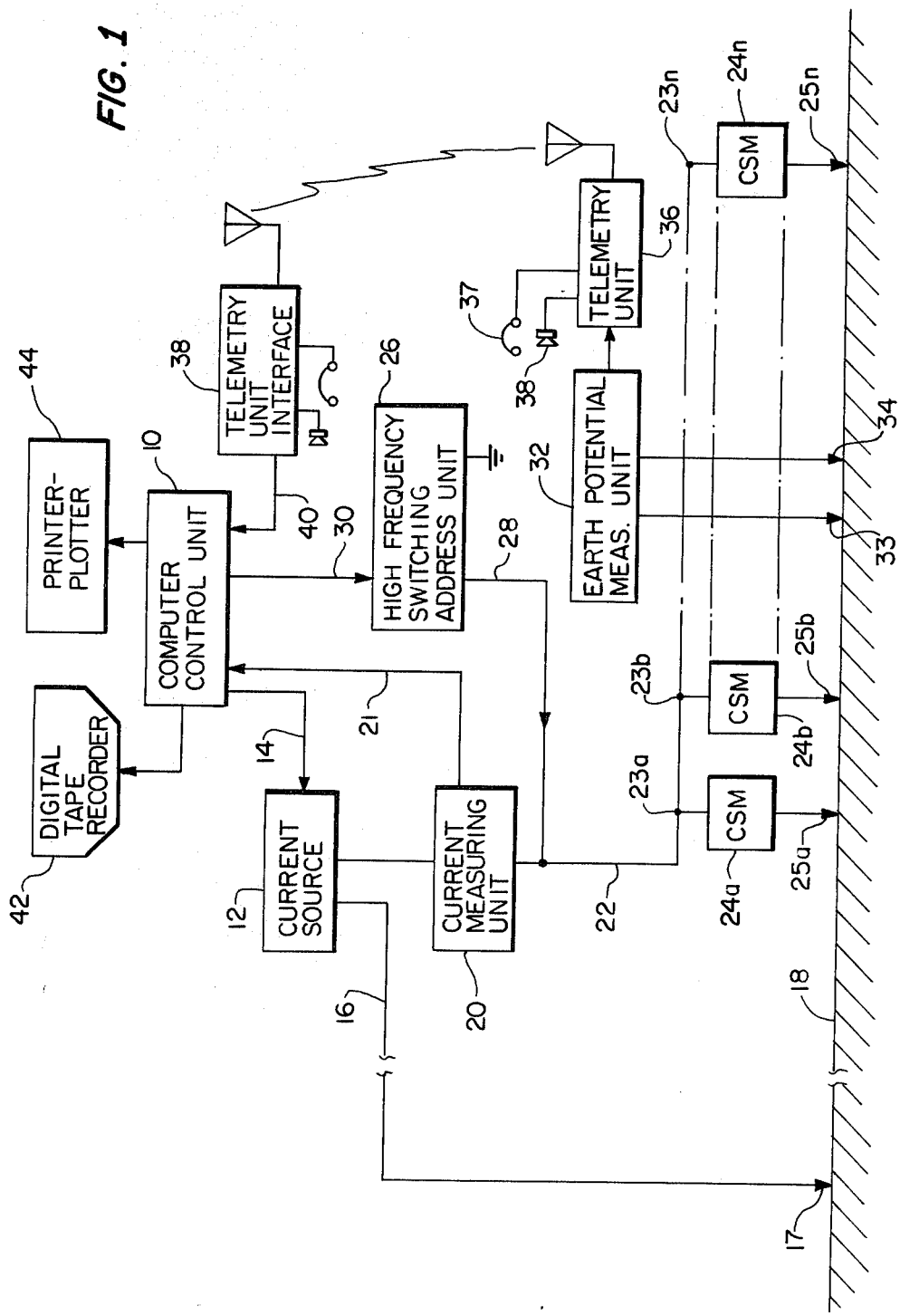
FIG. 1 is a schematic block diagram of a system in accordance with the present invention.

Turning now to the drawings in detail, it will be seen that FIG. 1 shows an overall block diagram of a system in accordance with the present invention, a central element which is a computer control unit 10 which performs the functions of providing control signals, receiving measurement signals, receiving data input, performing processing on the data inputs, and controlling certain outputs to be recorded. These functions will be described in greater detail in connection with the individual units with which it cooperates. A major component of the control unit can be a Hewlett-Packard 9915A modular computer or equivalent which is a reliable device suitable for use in field test conditions. The programming is conveniently accomplished in BASIC programming language. Application software can easily be supplied to this computer by EPROM or magnetic tape.

The current for measurement purposes is supplied by a current source 12 which is a high-power, low frequency output power source capable of being modulated and controlled by signals provided on a conductor 14 from the computer control unit. The current source need not be of the constant current type, but the maximum output current and voltage levels are preferably internally limited. As will be described hereinafter, the output current is switched between zero, positive and negative levels.

One output terminal of current source 12 is connected to a single-conductor cable 16 which extends a considerable distance away from the apparatus and is connected to a probe 17 which is in good current-carrying conductive relationship with the surface of the earth 18. The other output terminal of source 12 is connected through a current measuring unit 20 which accurately measures the current and converts the measured analog value to a 14-bit digital signal which is supplied to the computer control unit on cable 21. Units 12 and 20 can conveniently be constructed as a single unit connected to an output cable 22 which is the primary current-carrying cable for measurement purposes. It is particularly important to note that cable 22 is a single-conductor cable which is insulated and which has a series of connection points 23a–n, the letter "n" being used to signify the last of a selected number of points, these connection points being substantially equally spaced along the length of the cable. The actual number of connection points is selectable as a system design feature, as is the spacing between connection points, depending upon the selected length of the cable, the region to be examined, and the desired spacing between current insertion points. An example of a spacing distance is 50 meters with 32 connection points.

To each connection point is connected a current switching module (CSM) 24a–n, the number of modules also being fairly large and selectable in accordance with the characteristics of the region to be explored. Each current switching module, the details of which will be discussed hereinafter, includes a switchable conductive path and means responsive to an address signal for selectively completing the path temporarily so that it can conduct current. The current thus conducted by each module is connected to one of a plurality of probes 25a–n which are coupled in good conductive relationship to the earth.

In this connection, it will be noted that each of the probes can constitute a metallic electrode which can be driven a small distance, in the order of a meter or less, into the earth which can be moistened with a saline solution to improve the conductive coupling between the electrode and the earth for carrying current. Various forms of probes can be used.

The current source 12 preferably supplies a current of several amperes, as much as 40 amperes or more, this current being modulated at a relatively low frequency, between about 0.1 hertz and 1.0 hertz, the modulation being supplied by the control unit, as previously indicated. In order to provide addressing signals for the various current switching modules which will not interfere with, or be interfered with by, the signal from the current source, a high frequency switching address unit 26 provides a sequence of address signals on a conductor 28 which is connected to the conductor of cable 22. The signal is a high frequency carrier signal, frequency shift key (FSK) encoded to convey the digital address data which is demodulated by each current switching unit. As will be described, the resulting digital signal is compared with a programmed address in each current switching module. When the digital address corresponds to the programmed address in a module, that individual module is energized by its own battery source contained therein, closing a relay which connects the output of current source 12 as supplied on cable 22 to the corresponding probe 25. As will be described, the switching of the switchable conductive path is accomplished when the current source 12 is not supplying a current output, thereby avoiding the need for the switching module to switch high current levels.

The high frequency switching address unit is supplied with the address codes, in a programmed selected sequence, by the computer control unit on a cable 30.

An earth potential measuring unit 32 is connected to two probes 33, 34 to measure the potential difference at various locations. The measuring unit 32 is movable so that the measurements can be made along a predetermined path in the survey area. The earth potential measurement signals are converted to digital form in which the signals are supplied to a telemetry unit 36 which transmits the FSK digitally coded signals to a radio telemetry unit 38 associated with the computer control unit, the telemetry units also being used for voice communication between the operator of the earth potential measuring unit and the operator of the control unit and related apparatus. This is symbolized by the head phones 37 and microphone 38.

As will be recognized, radio telemetry communication is an efficient technique for transmitting such information in many circumstances, but it will also be apparent that hard-wire or other modes of communication will be more appropriate in locations where interference is a problem or where topographical characteristics of the survey area are not suitable for telemetry.

The measured earth potential signals received by telemetry unit 38 are decoded and supplied to the computer control unit on a cable 40 and are associated therein with the current source signals and the identification of the current switching modules addressed and the potential measurement electrode position to form the sequence of measured data. The received data is recorded on a digital tape recorder 42 and related information can also be printed or plotted, as will be described, on a printer-plotter unit 44.

Figure 2:
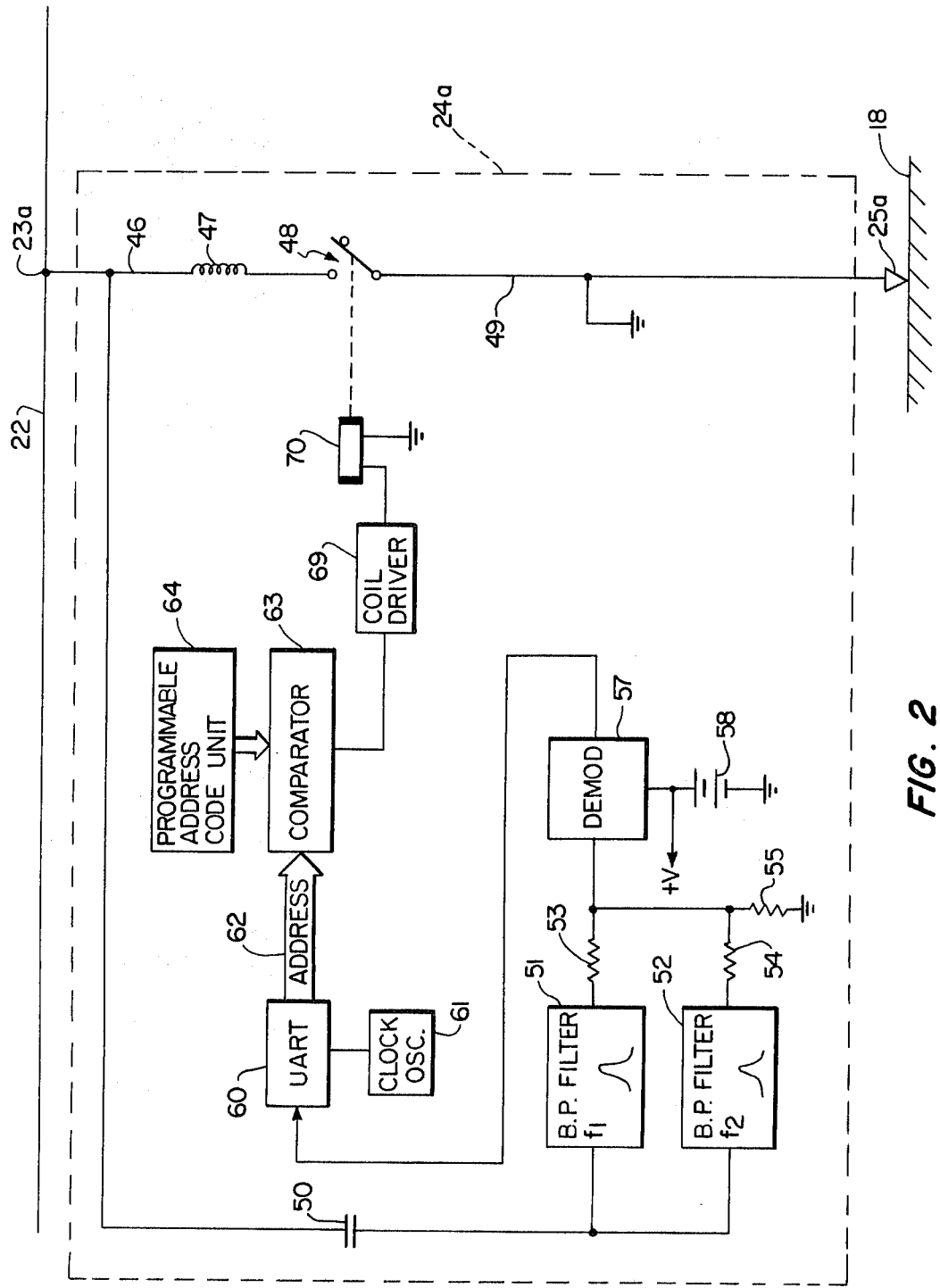
FIG. 2 is a schematic diagram, partly in block form, of a current switching module usable in the apparatus of FIG. 1.

One of the current switching modules 24a is more fully shown in FIG. 2, the other modules being identical to that illustrated. As previously described, the signal conductor cable 22 has a connection point 23a to which one end of a switchable conductive path is connected. As illustrated in FIG. 2, the path includes a conductor 46 which is connected to a choke coil 47 in series between connection point 23a and one terminal of a relay contact set indicated generally at 48. The other side of the contact set is connected, through a conductor 49, to probe 25a which couples current into the earth. Choke 47 has an inductance value on the order of 100 microhenries and is provided for the purpose of blocking high frequency signals from ground while permitting the passage of the low frequency current from source 12.

Conductor 46 is connected through a capacitor 50 to the inputs of two band pass filters 51 and 52 which are capable of passing the two high frequency carrier signals which are employed in the FSK-modulated signal by the high frequency switching address unit to produce the address signal. The mark and space elements of the address signals emerging from the filters are coupled through a summing resistance network including resistors 53, 54 and 55 and are delivered to the input of a phase locked loop (PLL) demodulator 57 which, as shown, has an operating voltage supply provided by a battery 58. The circuits employed in the current switching module are low current drain circuits to maximize battery life. The demodulated output is supplied to a universal asynchonous receiver/transmitter unit (UART) 60 which receives a timing input from a clock oscillator 61. The output of UART 60 is a serial 8-bit code on an address bus 62 which is supplied to one input of a digital comparator 63. A programmable address code unit 64 is coded with a predetermined address for the specific current switching module, this address being unique for each module. The comparator unit compares the address on bus 62 with the output of the programmable unit 64 and, if these are the same, an output signal is supplied to activate a coil driver circuit 69 which energizes the winding of a relay 70, closing contact set 48.

Figure 3:
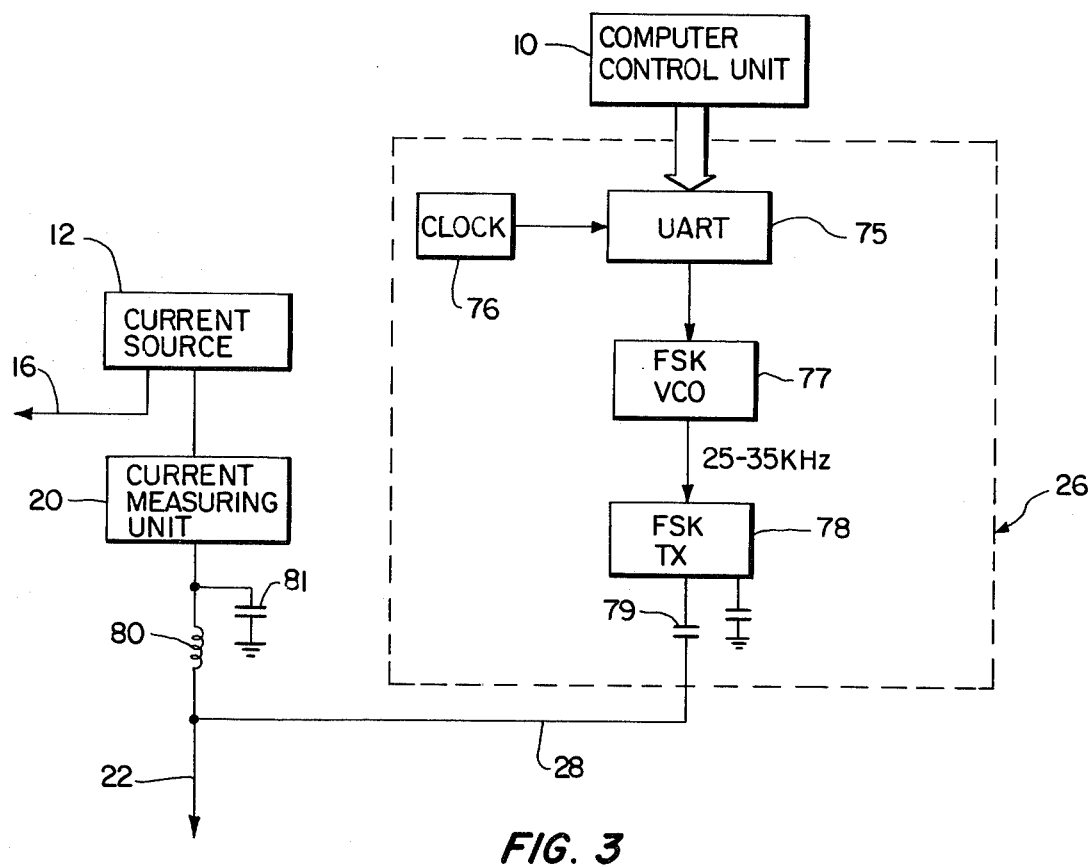
FIG. 3 is a schematic block diagram of a high frequency switching address unit usable in the apparatus of FIG. 1.

A schematic block diagram of a high frequency switching address unit 26 usable in the apparatus of FIG. 1 is shown in FIG. 3 and includes a UART unit 75 which receives address code information from computer control unit 1 and a clock input from clock 76. The output of UART 75 controls a frequency shift key voltage control oscillator 77, as is conventional in FSK modulation, to provide an output which switches between two frequencies to indicate the existance of marks and spaces constituting a digital address signal. The frequency can vary, for example, between 25 and 35 kHz. The VCO output is connected to an FSK transmitter 78, the output of which is coupled through a capacitor 79 to cable 22 on a conductor 28. It will be observed that the portion of cable 22 between the junction with conductor 28 and the current measuring unit includes a series choke 80 and a shunt capacitor 81 to ground to decouple the high frequency address signal from the current measuring unit. As previously described, the high frequency address signal is delivered on conductor 22 to the current switching module.

Figure 4:
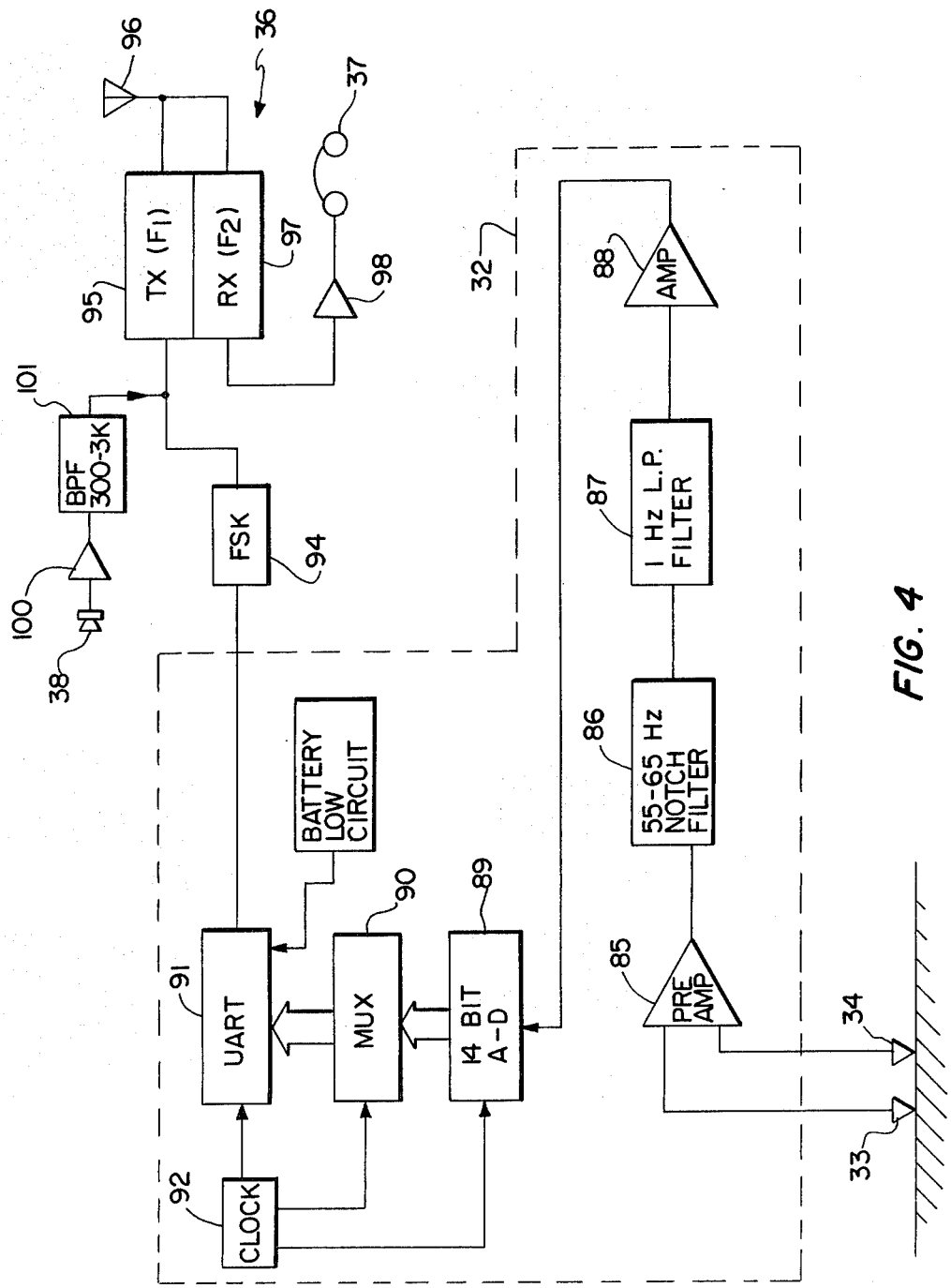
FIG. 4 is a schematic block diagram of an earth potential measuring unit usable in the apparatus of FIG. 1.

FIG. 4 illustrates a block diagram of an earth potential measuring unit 32 and a telemetry unit 36. Probes 33 and 34 are connected to the inputs of preamplifier 85, the output of which is connected to a notch filter 86 tuned to reject frequencies between about 55 and 65 hertz to reject noise resulting from power lines and the like. The signal is then coupled through a low pass filter 87 tuned to pass frequencies below about 1 hertz, thereby passing only those signals which originated from the current switching modules and probes. This signal is amplified in an amplifier 88 and supplied to the input of an analog to digital converter 89 which encodes the measured analog signal into a 14 bit word. This encoded signal is delivered to a multiplexer 90 which supplies the signal, in two successive 7 bit words to a UART unit 91. The converter, mutiplex and UART units are strobed and synchonized by a clock 92.

Figure 5:
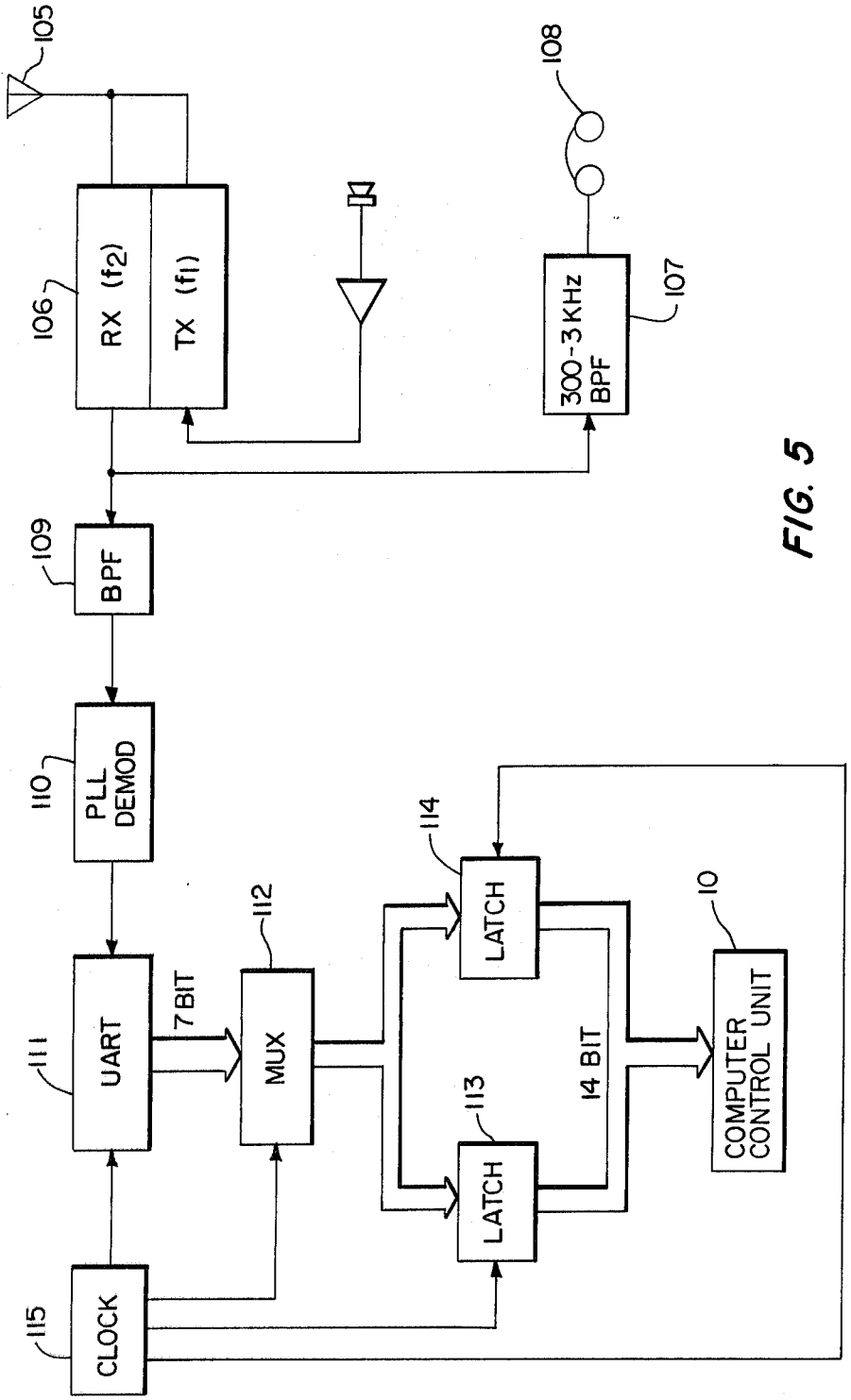
FIG. 5 is a schematic block diagram of a telemetry and interface unit usable in the apparatus of FIG. 1.

The UART output is delivered to a frequency shift keying modulator 94 in telemetry unit 36, the output of which is coupled to a telemetry transmitter 95 which radiates these signals from an antenna 96. Received voice signals are coupled through a receiver 97, amplified at 98 and provided to headphone 37 for voice communication. Transmitted voice communication from microphone 38 is amplified by an amplifier 100, filtered through a band pass filter 101 having a pass region between about 300 and 3,000 hertz. FIG. 5 illustrates the other end of the telemetry link at the control unit location, the signals being received by an antenna 105 and delivered to a receiver 106. Voice signals pass through a filter 107 having a pass region similar to filter 101 and are delivered to headphone 108 or the like. Data signals are passed through a band pass filter 109 and delivered to a phase locked loop demodulater 110 and then to a UART unit 111. For bandwidth reasons, the digitized code is transmitted as two seven bit words. Thus, the output of UART 111 is a seven-bit word coupled to multiplexer 112, the first word emanating therefrom being delivered to a latch 113 which temporarily stores the word. The second seven-bit word is delivered to a latch 114, after which the 14-bit word from both latches is delivered to the computer control unit 10. Again, the UART, multiplexer and latch units are synchronized by a clock 115.

Figure 6:
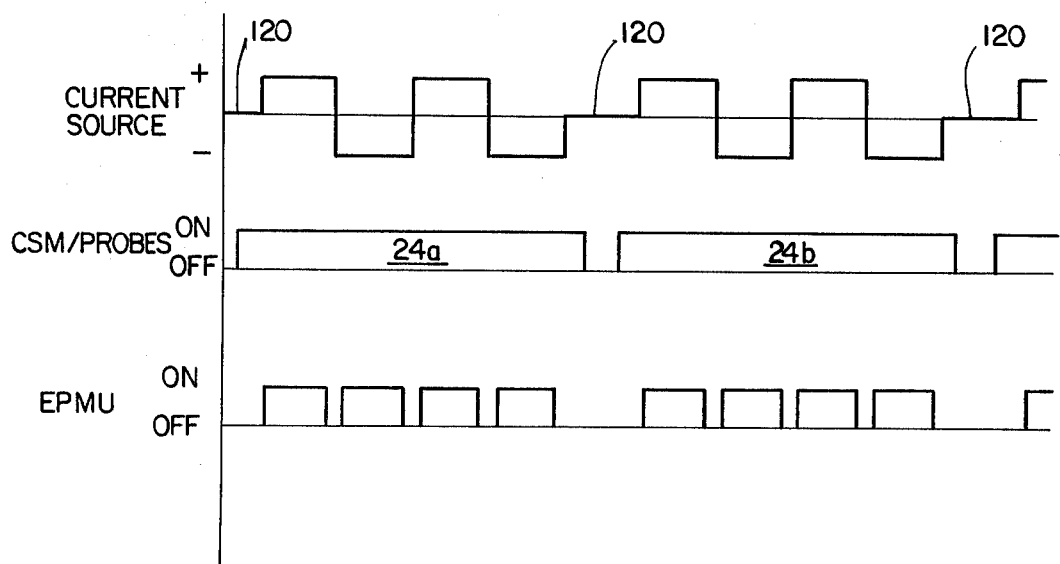
FIG. 6 is a wavefrom and timing diagram showing the time relationship existing in the operation of the apparatus of FIG. 1.

FIG. 6 illustrates some of the timing involved in the insertion of the current signals into the earth. The first line of FIG. 6 depicts a typical signal produced by the current source, as determined and commanded by the computer control unit. A first portion 120 of the current source signal is at a zero level, followed by one or more cycles of alternating positive and negative current levels. Each sequence of cycles is followed by another zero level interval. The number of complete cycles between zero levels is variable, depending upon frequency, and this can be determined and implemented simply by altering programming in the computer control unit.

The second line of FIG. 6 illustrates the on-off intervals for the current switching modules and probes. As will be observed, each CSM is turned on, and the switchable conductive path is closed, when the current source is at a zero level 120. Thus, CSM 24a is addresssed and actuated during the first zero level portion and is turned off during the second zero level portion, after which, in the same zero level portion, CSM 24b is turned on. Thus, it is not necessary for the switching modules to be required to switch while current is being supplied, thereby greatly extending relay contact life.

The third line of FIG. 6 illustrates the on/off sequences of the earth potential measuring unit. As will be observed, a plurality of measurements are taken during each "on" interval of the current source. Each measurement is timed to occur during the "flat" portion of the signal produced by the current source. The transition regions, as the current source is changing between its positive and its negative levels, are avoided to avoid any of the switching transient effects which occur and also to avoid measurements of any induced polarization effects in the geologic materials being surveyed. As will be recognized by those skilled in the art, alternate positive and negative signal portions are used to avoid galvanic polarization at the probes as well.

To briefly describe the processing operations of the computer control unit, as previously indicated, the computer control unit is supplied with measured current and voltage from unit 20 and is also supplied with the earth potential measurement. After scaling the current and potential values, a processor within unit 10 calculates a ratio of V/I for each measurement and compares that ratio, which is proportional to resistivity, with the previous reading taken for that electrode 25 and location of the Earth Potential Measurement Unit. If the readings are sufficiently close, they are summed and recorded along with address information about current and potential electrode locations.

For each scan through all of the current electrodes, the processor also records potential electrode location, current electrode separation, data identification and potential electrode separation.

To avoid spurious measurement effects, the processor can also be instructed to ignore readings from a predetermined number of current electrodes on either side of the potential probe location. Additionally, the processor reverses polarity of the signals, as recorded, for the transmitter when the current probe location transfers to the other side of the potential probe location.

The summed potential signals, correlated with position information, are used to produce a representation on printer-plotter 44 in a manner similar to that described in the Owen and Suhler paper cited above. As shown in the diagrams on page 11 of that paper, resistivity data is correlated with position data and is plotted with the density of the plot being proportional to the resistivity (or conductance, if desired) providing a plot which identifies a particular zone of contrast.

In addition, by producing a model in advance of the anticipated resistivities, taking into account known stratification in the region, the processor can be programmed to identify anomalies which have resistivities falling within a certain predetermined narrow range, specifically identifying those anomalies which are of particular interest, e.g., which contain petroleum.

In one such system, the cavity target is modeled numerically in the computer analysis to predict the apparent resistivity anomaly for various possible target positions under the traverse. In this process, the cavity model is systematically assumed to occupy each possible resolution cell and the associated theoretical apparent resistivity profile derived for each current source electrode position. The theoretically predicted resistivity profiles for each assumed target location are then cross correlated with the experimentally measured resistivity profiles to compare their perturbations in apparent resistivity.

The result of this matched filter process is a correlation coefficient for each assumed target location whose values are plotted in the respective resolution cells analyzed. This model analysis and correlation with actual data is performed for each subsurface resolution cell of interest underlying the survey traverse. The results assigned to each cell form a two-dimensional image of apparent resistivity when displayed as shade-of-gray or contour line plots corresponding to the correlation coefficient values.

Although this electrical geophysical exploration system has been described in conjunction with the foregoing earth resistivity embodiment and application, many alternatives, variations and modifications are apparent to those of ordinary skill in the art. Those alternatives, variations and modifications are intended to fall within the spirit and scope of the appended claims.

What is claimed is:

1. An electrical geophysical exploration system comprising:
   a source of electric current;
   a single conductor cable connected to the output of said current source, said cable having a plurality of longitudinally spaced connection points extending along the surface of the earth;
   a plurality of probe means for coupling current into the earth;
   a plurality of addressable switching units, each of said switching units being connected between one of said connection points along said cable and one of said probe means, each of said switching units being responsive to a unique address signal to temporarily electrically interconnect its associated connection point and probe means;
   means, coupled to said cable, for providing a series of address signals on said single conductor cable to sequentially activate said switching units, whereby current from said source is connected individually through said switching units to said probe means in a predetermined sequence; and means for measuring the resultant electrical signals generated by said probe means and conducted through the earth at locations along the surface of the earth spaced from said probe means.

2. A system according to claim 1 wherein said means for measuring the resultant electrical signals includes means for measuring scalar earth resistivity.

3. A system according to claim 1 wherein each of said addressable switchable units includes means for storing a coded address unique to that switching unit;

means for receiving and decoding address signals provided on said single conductor cable;

means for comparing the decoded address signals with the stored adress and for producing an output signal when a match is recognized; and means, responsive to said output signal, for closing a path for current flow from the connection point to which said switching unit is connected and the associated probe means.

4. A system according to claim 1, and further comprising means, coupled to said source of electric current, for varying the level of said current between a zero level and alternating positive and negative levels, and means, coupled to said addressable switching units and to said means for varying the level of said current, for turning said addressable switching units on and off only when said current level is zero.

* * * * *